United States Patent
Noel

(10) Patent No.: US 10,395,408 B1
(45) Date of Patent: Aug. 27, 2019

(54) SYSTEMS AND METHODS FOR RENDERING VECTOR SHAPES

(71) Applicant: GoPro, Inc., San Mateo, CA (US)

(72) Inventor: Jean-Baptiste Noel, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 131 days.

(21) Appl. No.: 15/730,999

(22) Filed: Oct. 12, 2017

Related U.S. Application Data

(60) Provisional application No. 62/408,688, filed on Oct. 14, 2016.

(51) Int. Cl.
- *G06T 11/20* (2006.01)
- *G06T 11/60* (2006.01)
- *G06T 15/04* (2011.01)

(52) U.S. Cl.
CPC ............ *G06T 11/60* (2013.01); *G06T 11/20* (2013.01); *G06T 15/04* (2013.01)

(58) Field of Classification Search
CPC .......... G06T 11/60; G06T 11/20; G06T 15/04
See application file for complete search history.

(56) References Cited

U.S. PATENT DOCUMENTS

| | | | | |
|---|---|---|---|---|
| 4,855,934 A * | 8/1989 | Robinson | ............... | G06T 15/04 345/582 |
| 6,184,893 B1 * | 2/2001 | Devic | ................... | G06T 11/40 345/428 |
| 6,239,808 B1 * | 5/2001 | Kirk | ....................... | G06T 15/04 345/582 |
| 6,373,495 B1 * | 4/2002 | Lin | ......................... | G06T 15/04 345/428 |
| 7,095,418 B2 * | 8/2006 | Levene | ................... | G06T 15/04 345/441 |
| 7,595,806 B1 * | 9/2009 | Toksvig | .................. | G06T 15/04 345/582 |
| 7,953,260 B2 * | 5/2011 | Weinzweig | ............. | G06T 13/40 382/128 |
| 8,416,242 B1 * | 4/2013 | Hutchins | ................. | G06T 15/00 345/428 |
| 9,082,216 B2 * | 7/2015 | Burley | ..................... | G06T 15/04 |
| 9,557,181 B2 * | 1/2017 | Ivanov | .................... | G06T 15/00 |
| 2002/0135591 A1 * | 9/2002 | Zhang | ...................... | G06T 15/40 345/582 |
| 2003/0184556 A1 * | 10/2003 | Hollis | ................... | G06T 11/001 345/582 |

(Continued)

*Primary Examiner* — Mia M Thomas

(74) *Attorney, Agent, or Firm* — Esplin & Associates, PC

(57) ABSTRACT

A vector shape may have a first edge and a second edge that defines an intersection feature. A distance map may be divided into texels. The distance map may characterize the vector shape with a flag field, a first distance field, and a second distance field. The flag field may indicate the use of one-distance field rendering or two-distance field rendering for a given texel. The use of two-distance field rendering for the given texel may include use of the first distance field characterizing a first distance between the given texel and the first edge and the second distance field characterizing a second distance between given the texel and the second edge. Based on the use of two-distance field rendering for the given texel, the vector shape corresponding to the given texel may be rendered based on the first distance field and the second distance field.

20 Claims, 6 Drawing Sheets

(56) References Cited

U.S. PATENT DOCUMENTS

| | | | |
|---|---|---|---|
| 2004/0125103 A1* | 7/2004 | Kaufman | G06T 15/06 345/419 |
| 2004/0160453 A1* | 8/2004 | Horton | G06T 11/40 345/582 |
| 2004/0233210 A1* | 11/2004 | Hancock | G06F 3/14 345/582 |
| 2005/0088450 A1* | 4/2005 | Chalfin | G06T 15/04 345/552 |
| 2014/0123147 A1* | 5/2014 | Pantaleoni | G06F 16/90344 718/102 |
| 2014/0176550 A1* | 6/2014 | Park | G06T 15/04 345/426 |
| 2014/0333621 A1* | 11/2014 | Hillesland | G06T 15/04 345/423 |
| 2015/0130818 A1* | 5/2015 | Peng | G06T 15/04 345/501 |
| 2015/0130819 A1* | 5/2015 | Peng | G06T 15/04 345/501 |
| 2015/0130826 A1* | 5/2015 | Peng | G06T 15/04 345/552 |
| 2017/0372457 A1* | 12/2017 | Sylvan | G02B 27/017 |
| 2018/0107894 A1* | 4/2018 | Song | G06T 3/40 |
| 2018/0213288 A1* | 7/2018 | Patry | H04N 21/47205 |
| 2018/0224935 A1* | 8/2018 | Thunstrom | G06F 3/013 |

* cited by examiner distance map C 20C iso-distance line C 50
edge C-1 52 edge C-2 54

FIG. 5

SYSTEMS AND METHODS FOR RENDERING VECTOR SHAPES

FIELD

This disclosure relates to systems and methods that render vector shapes.

BACKGROUND

Rendering high quality vector shapes (e.g., text) using bitmaps may be resource intensive. Rendering high quality vector shapes using bitmaps may require high quality bitmaps. Resource usage for rendering vector shapes may be reduced by using a single-field distance map rendering. However, the use of a single-field distance map rendering of vector shapes may result in visual defects of the vector shapes (e.g., rounding of sharp corners, wiggling edges, missing thin parts). The use of a single-field distance map rendering may not allow for rendering of details that are smaller than the distance between two adjacent texels.

SUMMARY

This disclosure relates to rendering vector shapes. A vector shape may have a first edge and a second edge that defines an intersection feature. A distance map may be divided into texels. The distance map may characterize the vector shape with a flag field, a first distance field, and a second distance field. The flag field may indicate the use of one-distance field rendering or two-distance field rendering for a given texel. The use of two-distance field rendering for the given texel may include use of the first distance field characterizing a first distance between the given texel and the first edge and the second distance field characterizing a second distance between the given texel and the second edge. The use of two-distance field rendering may be determined based on the flag field for individual texels. Responsive to the determination of the use of two-distance field rendering for the given texel, the vector shape corresponding to the given texel may be rendered based on the first distance field and the second distance field.

A system that renders vector shapes may include one or more of physical storage media, processors, and/or other components. In some implementations, a vector shape may include a text and/or other vector shapes. A vector shape may have a first edge and a second edge that defines an intersection feature. In some implementations, the intersection feature may include a corner, a bisector of the corner, an iso-distance line, and/or other intersection features. In some implementations, the intersection feature may be curved.

The physical storage media may store one or more distance maps and/or other information. A distance map may be divided into texels. The distance map may define parameters on a per texel basis. The parameters may include a flag value, a first distance value, a second distance value, and/or other values such that the flag values of the texels form a flag field, the first distance values of the texels form a first distance field, the second distance values of the texels form a second distance field, and/or other values of the texels form other field(s).

The distance map may characterize a vector shape with the flag field, the first distance field, the second distance field, and/or other field(s). The flag field may indicate use of a one-distance field rendering or a two-distance field rendering for a given texel. The use of the two-distance field rendering for the given texel may include use of the first distance field characterizing a first distance between the given texel and the first edge and the second distance field characterizing a second distance between the given texel and the second edge. In some implementations, the use of the two-distance field rendering may be limited to texels on or around the intersection feature. In some implementations, the texels on or around the intersection feature may include one or more two-by-two texel blocks and/or other texels. In some implementations, the texels on or around the intersection feature may include margin texels around one or more two-by-two texel blocks.

In some implementations, the use of the one-distance field rendering for the given texel may include use of the first distance field characterizing a third distance between the given texel and an edge of the vector shape. In some implementations, the use of the one-distance field rendering for the given texel may include use of the second distance field characterizing the third distance between the given texel and an edge of the vector shape. In some implementations, the use of the one-distance field rendering for the given texel may include use of another distance field characterizing the third distance between the given texel and an edge of the vector shape.

The processor(s) may be configured by machine-readable instructions. Executing the machine-readable instructions may cause the processor(s) to facilitate rendering vector shapes. The machine-readable instructions may include one or more computer program components. The computer program components may include one or more of a rendering type component, a rendering component, and/or other computer program components. In some implementations, the computer program components may include a generation component.

The rendering type component may be configured to determine the use of the two-distance field rendering based on the flag field for individual ones of the texels and/or other information. In some implementations, the rendering type component may be configured to determine the use of the one-distance field rendering based on the flag field for the individual ones of the texels and/or other information.

The rendering component may be configured to, responsive to the determination of the use of the two-distance field rendering for the given texel, render the vector shape corresponding to the given texel based on the first distance field, the second distance field, and/or other information. In some implementations, the vector shape may be rendered based on the first distance field and the second distance field using bilinear interpolation. The rendering component may be configured to, responsive to the determination of the use of the one-distance field rendering for the given texel, render the vector shape corresponding to the given texel based on the first distance field and/or other information.

The generation component may be configured to generate a distance map for a vector shape. The generation component may generate the distance map using one-distance field rendering and/or two-distance field rendering. Generation of the distance map using the two-distance field rendering may be limited to texels on or around an intersection feature of the vector shape.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 5 illustrates an exemplary distance map for a portion of a vector shape with a thin feature.

DETAILED DESCRIPTION

Figure 1:
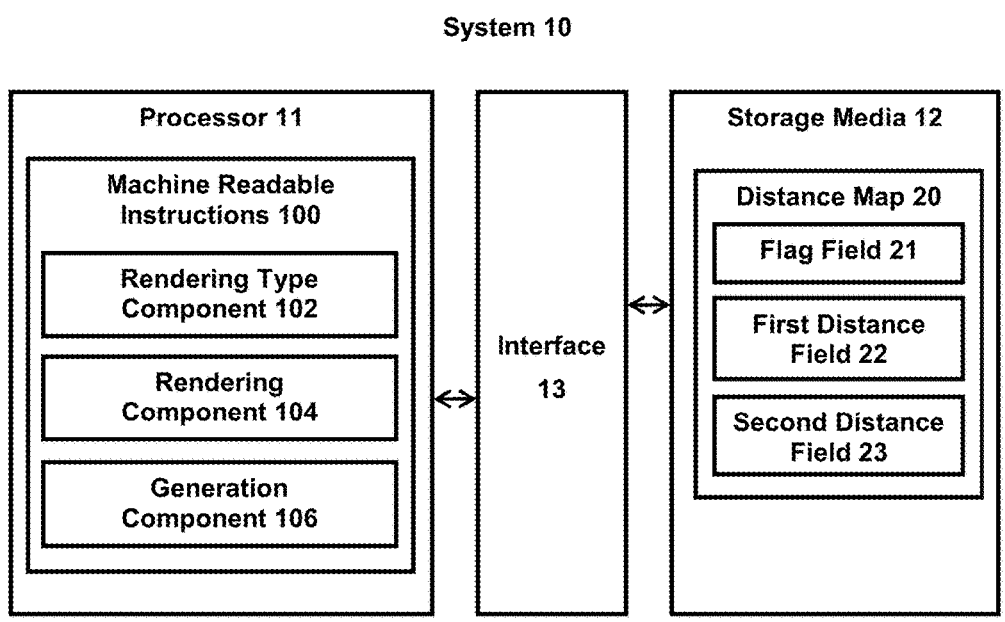
FIG. 1 illustrates a system that renders vector shapes.

FIG. 1 illustrates system 10 for rendering vector shapes. System 10 may include one or more of processor 11, storage media 12, interface 13 (e.g., bus, wireless interface), and/or other components. A vector shape may have a first edge and a second edge that defines an intersection feature. Storage media 12 may include distance map 20. Distance map 20 may be divided into texels. Distance map 20 may characterize the vector shape with flag field 21, first distance field 22, and second distance field 23. Flag field 21 may indicate the use of one-distance field rendering or two-distance field rendering for a given texel of distance map 20. The use of two-distance field rendering for the given texel may include use of first distance field 22 characterizing a first distance between the given texel and the first edge of the vector shape and second distance field 23 characterizing a second distance between the given texel and the second edge. The use of two-distance field rendering may be determined based on flag field 21 for individual texels. Responsive to the determination of the use of two-distance field rendering for the given texel, the vector shape corresponding to the given texel may be rendered based on first distance field 22 and second distance field 23.

A vector shape may refer to a shape defined using vectors. A vector shape may be composed of a set of shapes. Changes in scale of a vector shape (e.g., changes in zoom) may preserve the shape of the vector shape. A vector shape may be defined with one or more Bezier curves. One or more edges of a vector shape may be straight or curved. In some implementations, a vector shape may include a text and/or other vector shapes. A vector shape may have multiple edges that define one or more intersection features. For example, a vector shape may have two edges that define an intersection feature. In some implementations, the intersection feature may include a corner, a bisector of the corner, an iso-distance line, and/or other intersection features. In some implementations, the intersection feature may be straight (e.g., straight bisector) or curved (e.g., curved iso-distance line).

Figure 3:
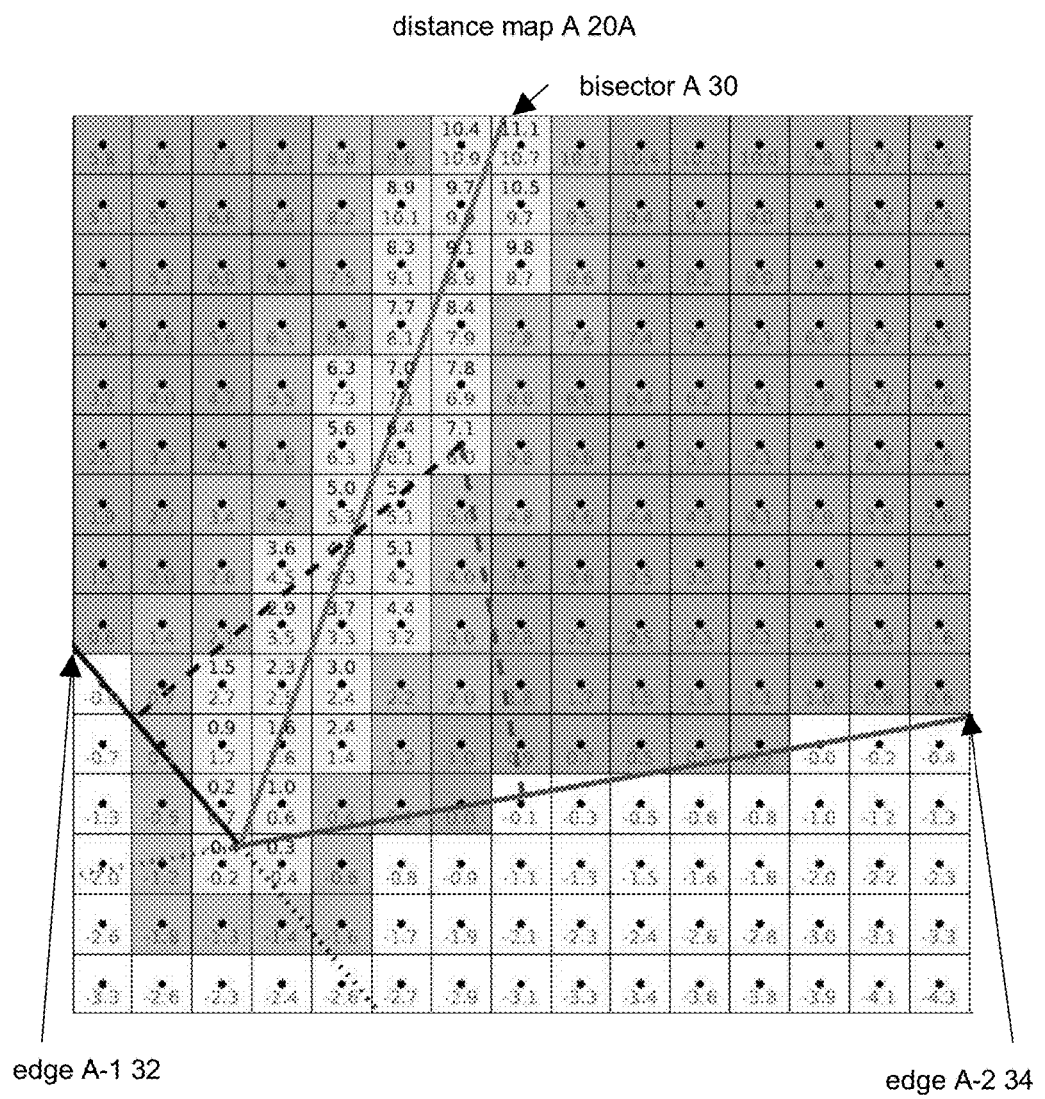
FIG. 3 illustrates an exemplary distance map for a portion of a vector shape with an obtuse angle.
Figure 4:
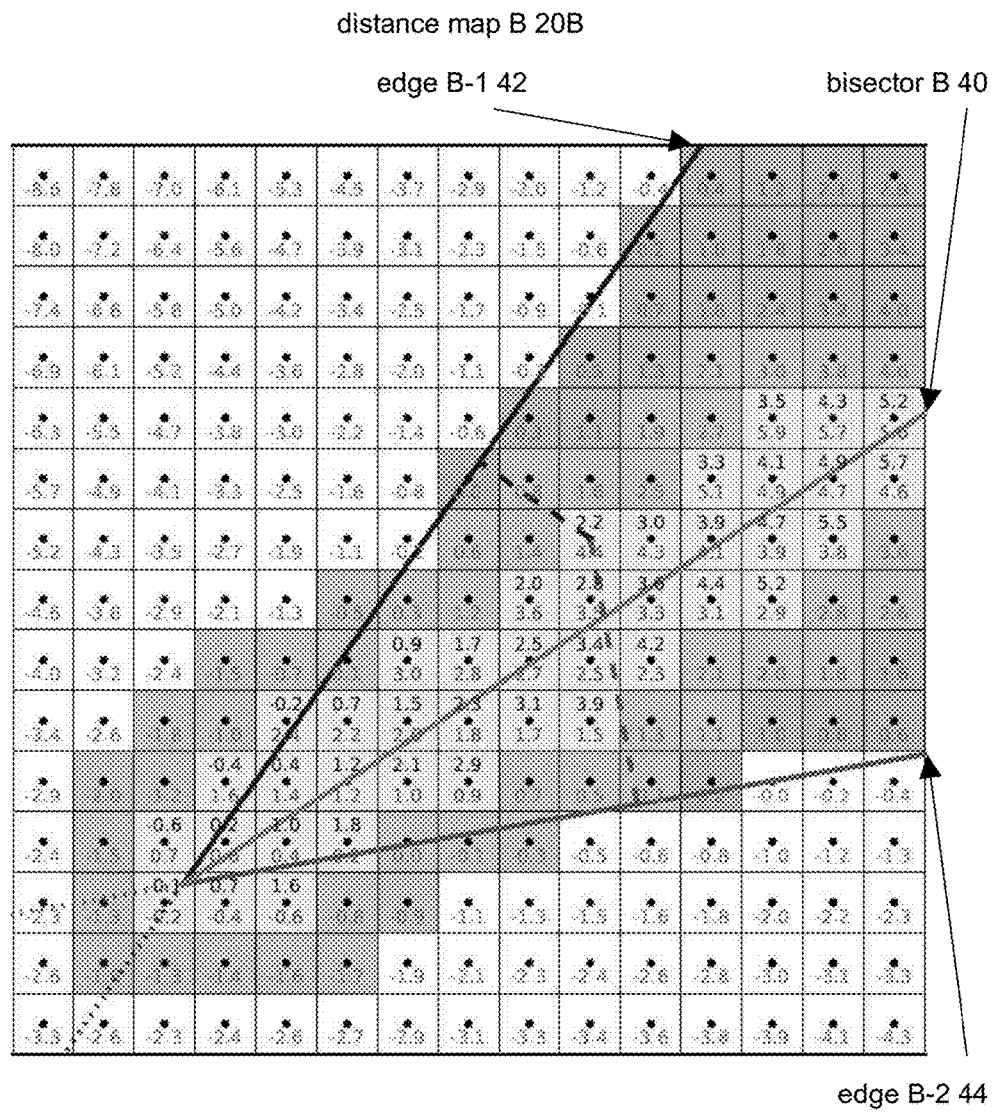
FIG. 4 illustrates an exemplary distance map for a portion of a vector shape with an acute angle.
Figure 6:
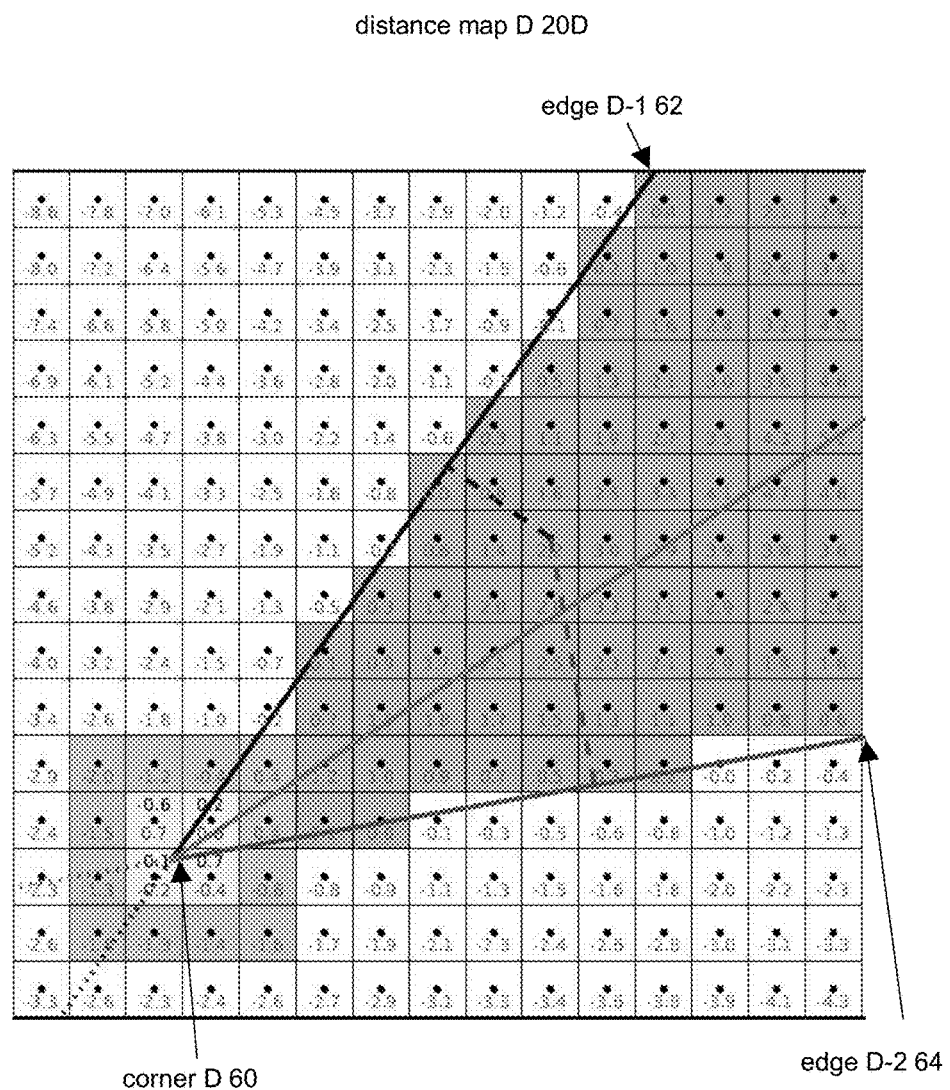
FIG. 6 illustrates an exemplary distance map for a portion of a vector shape with an acute angle.

For example, FIGS. 3-6 illustrate exemplary intersection features of vector shapes. FIG. 3 may include a portion of a vector shape with the intersection feature of bisector A 30. The vector shape may include edge A-1 32 and edge A-2 34 that defines bisector A 30. Bisector A 30 may cut an obtuse angle formed by edge A-1 32 and edge A-2 34 in half. FIG. 4 may include a portion of a vector shape with the intersection feature of bisector B 40. The vector shape may include edge B-1 42 and edge B-2 44 that defines bisector B 40. Bisector B 40 may cut an acute angle formed by edge B-1 42 and edge B-2 44 in half. FIG. 5 may include a portion of a vector shape with the intersection feature of iso-distance line C 50. The vector shape may include edge C-1 52 and edge C-2 54 that defines iso-distance line C 50. Iso-distance line C 50 may move along points that are of equal distance from edge C-1 52 and edge C-2 54. FIG. 6 may include a portion of a vector shape with the intersection feature of corner D 60. The vector shape may include edge D-1 62 and edge D-2 64 that defines corner D 60.

Storage media 12 may include electronic storage medium that electronically stores information. Storage media 12 may store software algorithms, information determined by processor 11, information received remotely, and/or other information that enables system 10 to function properly. For example, storage media 12 may store information relating to vector shapes, texels, distance maps, flag values, flag fields, distance flags, distance fields, one-distance field rendering, two-distance field rendering, and/or other information.

Storage media 12 may store one or more distance maps and/or other information. For example, storage media 12 may store distance map 20 and/or other distance maps. Distance map 20 may be divided into texels. Texels may refer to a base unit of a graphic. For example, in FIGS. 3-6, distance maps 20A, 20B, 20C, 20D may be divided into texels. Texels of distance maps 20A, 20B, 20C, 20D may be represented as square cells in FIGS. 3-6. Distance map 20 may define parameters for rendering a vector shape on a per texel basis. The parameters for rendering a vector shape may include multiple values. The parameters for rendering a vector shape may include a flag value, a first distance value, a second distance value, and/or other values. The flag values of the texels may form flag field 21. The first distance values of the texels may form first distance field 22. The second distance values of the texels may form second distance field 23. Other values of the texels may form other field(s).

Distance map 20 may characterize a vector shape with flag field 21, first distance field 22, second distance field 23, and/or other field(s). Flag field 21 may indicate use of a one-distance field rendering or a two-distance field rendering for a given texel. The use of flag field 21 may allow for switching between the one-distance field rendering or the two-distance field rendering for different portions of the vector shape. The use of the two-distance field rendering for portions of a vector shape may allow for rendering of sharp corners or thin parts without visual defects. The use of the one-distance field rendering for portions of a vector shape may allow for simpler rendering of portions of vector shapes that can be rendered properly with a single distance field.

The use of the two-distance field rendering for a given texel may include use of first distance field 22 characterizing the distance between the given texel and a first edge of the vector shape and second distance field 23 characterizing the distance between the given texel and a second edge of the vector shape. First distance field 22 and second distance field 23 may represent signed distances to the two closest edges (e.g., of an angle or a thin part) of the vector shape. In FIGS. 3-6, The first distance values of the texels (forming first distance field 22) may be listed above the second distance values of the texels (forming second distance field 23). First distance field 22 and second distance field 23 may be used to render certain portions of the vector shape (e.g., angle, thin part). The positive values of the distance fields 22, 23 may indicate a distance on the inner side of the vector shape and the negative values may indicate a distance on the outer side of the vector shape. In some implementations, the values of the distance fields 22, 23 may be normalized between 0 and 1.

The use of the two-distance field rendering may be limited to the texels on or around an intersection feature. For example, in FIG. 3, the intersection feature may include bisector A 30. Flag field 21 for the texels on or around bisector A 30 may indicate the use of the two-distance field rendering for the texels. First distance field 22 for the texels on or around bisector A 30 may characterize the distance between a given texel and edge A-1 32 of the vector shape. Second distance field 23 for the texels on or around bisector A 30 may characterize the distance between a given texel and edge A-2 34 of the vector shape.

In FIG. 4, the intersection feature may include bisector B 40. Flag field 21 for the texels on or around bisector B 40 may indicate the use of the two-distance field rendering for the texels. First distance field 22 for the texels on or around bisector B 40 may characterize the distance between a given texel and edge B-1 42 of the vector shape. Second distance field 23 for the texels on or around bisector B 40 may characterize the distance between a given texel and edge B-2 44 of the vector shape.

In FIG. 5, the intersection feature may include iso-distance line C 50. Flag field 21 for the texels on or around iso-distance line C 50 may indicate the use of the two-distance field rendering for the texels. First distance field 22 for the texels on or around iso-distance line C 50 may characterize the distance between a given texel and edge C-1 52 of the vector shape. Second distance field 23 for the texels on or around iso-distance line C 50 may characterize the distance between a given texel and edge C-2 54 of the vector shape.

In FIG. 6, the intersection feature may include corner D 60. Flag field 21 for the texels on or around corner D 60 may indicate the use of the two-distance field rendering for the texels. First distance field 22 for the texels on or around corner D 60 may characterize the distance between a given texel and edge D-1 62 of the vector shape. Second distance field 23 for the texels on or around corner D 60 may characterize the distance between a given texel and edge D-2 64 of the vector shape.

In some implementations, the use of the two-distance field rendering may be simplified by restricting its use to particular portions of the distance map based on the shape of the vector shape. For example, the use of the two-distance field rendering may be limited to an angle bisector area based on the vector shape having angles greater than 30 degrees. The use of the two-distance field rendering may be limited to a corner area based on the vector shape having corners that are greater than or equal to 30 degrees. The use of the two-distance field rendering may be limited to an iso-distance line area for thin parts of the vector shape. Thin parts of the vector shape may include shapes that are smaller than the distance between two adjacent texels.

In some implementations, the texels on or around an intersection feature may include one or more two-by-two texel blocks and/or other texels. For example, in FIGS. 3-6, the texels on or around the intersection feature (bisector A 30, bisector B 40, iso-distance line C 50, corner D 60) may include first and second distance values in blocks of two-by-two texels so that the values of first distance field 21 and second distance field 23 may be interpolated via bilinear interpolation during rendering.

In some implementations, the texels on or around an intersection feature may include margin texels around one or more two-by-two texel blocks. For example, in FIGS. 3-6, the texels around the border of two-by-two texel blocks using the two-distance field rendering may be added to the texels using two-distance field rendering. Including margin texels in two-distance field rendering may extend the area of two-distance field rendering texels by one at the border. Including margin texels in two-distance field rendering may improve robustness of the vector shape rendering.

In some implementations, the use of the two-distance field rendering may be restricted to an inner portion of a corner having an angle measuring less than 180 degrees or an outer portion of a corner for having an angle measuring more than 180 degrees. In some implementations, the use of the two-distance field rendering may be applied to both inner and outer portions of a corner.

The use of the one-distance field rendering for a given texel may include use of a distance field characterizing the distance between the given texel and an edge of the vector shape. The distance field may characterize the distance between a given texel and the closest edge of the vector shape. The distance field may represent signed distances to the closest edge (e.g., of an angle or a thin part) of a vector shape. The positive values of the distance field may indicate a distance on the inner side of the vector shape and the negative values may indicate a distance on the outer side of the vector shape. In some implementations, the values of the distance field may be normalized between 0 and 1.

In some implementations, the distance values characterizing the distance between a given texel and the closest edge of the vector shape may be stored in first distance field 22. In some implementations, the distance values characterizing the distance between a given texel and the closest edge of the vector shape may be stored in second distance field 23. In some implementations, the distance values characterizing the distance between a given texel and the closest edge of the vector shape may be stored in another distance field used for one-distance field rendering.

The one-distance field rendering may be used for texels that are not on or around an intersection feature. For example, in FIG. 3, flag field 21 for the texels not on or around bisector A 30 may indicate the use of the one-distance field rendering for the texels. First distance field 22, second distance field 23, and/or another distance field for the texels not on or around bisector A 30 may characterize the distance between a given texel and closer of edge A-1 32 and edge A-2 34 of the vector shape.

in FIG. 4, flag field 21 for the texels not on or around bisector B 40 may indicate the use of the one-distance field rendering for the texels. First distance field 22, second distance field 23, and/or another distance field for the texels not on or around bisector B 40 may characterize the distance between a given texel and closer of edge B-1 42 and edge B-2 44 of the vector shape.

in FIG. 5, flag field 21 for the texels not on or around iso-distance line C 50 may indicate the use of the one-distance field rendering for the texels. First distance field 22, second distance field 23, and/or another distance field for the texels not on or around iso-distance line C 50 may characterize the distance between a given texel and closer of edge C-1 52 and edge C-2 54 of the vector shape.

in FIG. 6, flag field 21 for the texels not on or around corner D 60 may indicate the use of the one-distance field rendering for the texels. First distance field 22, second distance field 23, and/or another distance field for the texels not on or around corner D 60 may characterize the distance between a given texel and closer of edge D-1 62 and edge D-2 64 of the vector shape.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate rendering vector shapes. Machine readable instructions 100 may include one or more computer program components. Machine readable instructions 100 may include one or more of rendering type component 102, rendering component 104, and/or other computer program components. In some implementations, machine readable instructions 100 may include generation component 106 and/or other computer program components.

Rendering type component 102 may be configured to determine the use of the one-distance field rendering or the two-distance field rendering based on the flag field for individual texels and/or other information. Rendering type component 102 may check flag field 21 of individual texels to determine whether the texels use the one-distance field rendering or the two-distance field rendering. In some implementations, rendering type component 102 may determine the use of the two-distance field rendering for a given texel based on flag field 21 for the given texel being set. Rendering type component 102 may determine the use of the one-distance field rendering for a given texel based on flag field 21 for the given texel being cleared. In some implementations, rendering type component 102 may determine the use of the two-distance field rendering for a given texel based on flag field 21 for the given texel being cleared. Rendering type component 102 may determine the use of the one-distance field rendering for a given texel based on flag field 21 for the given texel being set. Other uses of flag field 21 to determine use of the one-distance field rendering or the two-distance field rendering for texels are contemplated.

Rendering component 104 may be configured to, responsive to the determination of the use of the two-distance field rendering for the given texel, render the vector shape corresponding to the given texel based on first distance field 22, second distance field 23, and/or other information. First distance field 22 and second distance field 23 may indicate whether a given texel is inside or outside the vector shape. For example, rendering component 104 may include a fragment shader that uses information about distances to two closest edges of a vector shape (included in first distance field 22 and second distance field 23) to render sharp corners (e.g., shown in FIGS. 3-4) or thin parts (e.g., shown in FIG. 5) of the vector shape without visual defects. The vector shape may be rendered based on first distance field 22 and second distance field 23 using bilinear interpolation. For example, shape of corner D 60 in FIG. 6 may be rendered using bilinear interpolation of values from first distance field 22 and second distance field 23 for two-by-two texels on or around corner D 60. In some implementations, rendering component 104 may add visual effects (e.g., outlines, shadow, glow) to the vector shape.

Rendering component 104 may be configured to, responsive to the determination of the use of the one-distance field rendering for the given texel, render the vector shape corresponding to the given texel based on a distance field (e.g., first distance field 22) characterizing the distance between the given texel and an edge of the vector shape and/or other information. The distance field may indicate whether a given texel is inside or outside the vector shape. For example, rendering component 104 may include a fragment shader that uses information about the distance to the closest edge of a vector shape (e.g., included in first distance field 22, second distance field 23, or another distance field used for one-distance field rendering) to render the vector shape corresponding to the given texel.

Generation component 106 may be configured to generate one or more distance maps for a vector shape. Generation component 106 may generate a distance map using one-distance field rendering, two-distance field rendering, and/or other types of rendering. Generation of a distance map using the two-distance field rendering may be limited to texels on or around an intersection feature of the vector shape. For example, generation component 106 may generate distance map A 20A, distance map B 20B, distance map C 20C, distance map D 20D, and/or other distance maps for vector shapes. Generation component 106 may determine whether individual texels of the distance map is inside or outside the vector shape. On or around an intersection feature of the vector shape, generation component 106 may indicate the use of the two-distance field rendering in flag field 21, store a distance value characterizing the distance between a given texel and a first edge of the vector shape in first distance field 22, and store a distance value characterizing the distance between the given texel and a second edge of the vector shape in second distance field 23. Not on or around the intersection feature of the vector shape, generation component 106 may indicate the use of the one-distance field rendering in flag field 21, and store a distance value characterizing the distance between a given texel and the closest edge of the vector shape in a distance field (e.g., first distance field 22, second distance field 23, or another distance field used for one-distance field rendering).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and storage media 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with storage media 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, and/or 106 may be eliminated, and some or all of its functionality may be provided by other computer program components. As another example, processor 11 may be configured to execute one or more additional computer program components that may perform some or all of the functionality attributed to one or more of computer program components 102, 104, and/or 106 described herein.

The electronic storage media of storage media 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Storage media 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Storage media 12 may be a separate component within system 10, or storage media 12 may be provided integrally with one or more other components of system 10 (e.g., processor 11). Although storage media 12 is shown in FIG. 1 as a single entity, this is for illustrative purposes only. In some implementations, storage media 12 may comprise a plurality of storage units. These storage units may be physically located within the same device, or storage media 12 may represent storage functionality of a plurality of devices operating in coordination.

Figure 2:
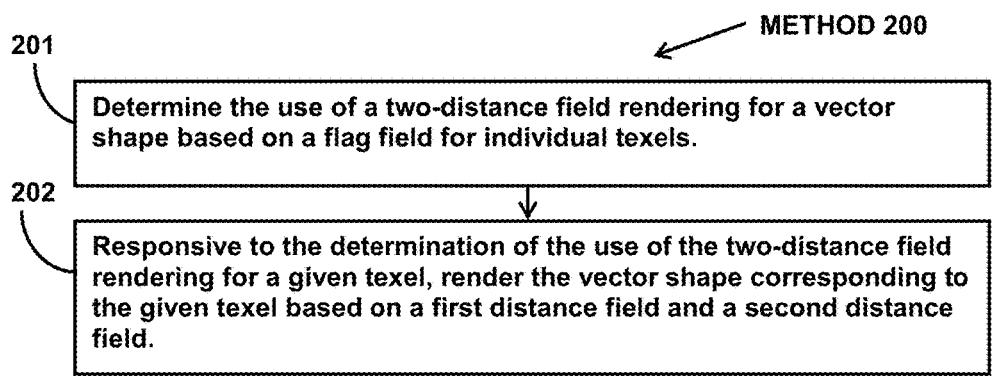
FIG. 2 illustrates a method for rendering vector shapes.

FIG. 2 illustrates method 200 for rendering vector shapes. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, the use of a two-distance field rendering for a vector shape may be determined based on a flag field for individual texels. In some implementation, operation 201 may be performed by a processor component the same as or similar to rendering type component 102 (Shown in FIG. 1 and described herein).

At operation 202, responsive to the determination of the use of the two-distance field rendering for a given texel, the vector shape corresponding to the given texel may be rendered based on a first distance field and a second distance field. In some implementations, operation 202 may be performed by a processor component the same as or similar to rendering component 102 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for rendering vector shapes, the system comprising:

physical storage media storing a distance map divided into texels, the distance map defining parameters on a per texel basis, the parameters including a flag value, a first distance value, and a second distance value such that the flag values of the texels form a flag field, the first distance values of the texels form a first distance field, and the second distance values of the texels form a second distance field, wherein the distance map characterizes a vector shape with the flag field, the first distance field, and the second distance field, the flag field indicating use of a one-distance field rendering or a two-distance field rendering for a given texel, the vector shape having a first edge and a second edge that defines an intersection feature, wherein the use of the two-distance field rendering for the given texel includes use of the first distance field characterizing a first distance between the given texel and the first edge and the second distance field characterizing a second distance between the given texel and the second edge;

one or more physical processors configured by machine-readable instructions to:
determine the use of the two-distance field rendering based on the flag field for individual ones of the texels; and
responsive to the determination of the use of the two-distance field rendering for the given texel, render the vector shape corresponding to the given texel based on the first distance field and the second distance field.

2. The system of claim 1, wherein:
the use of the one-distance field rendering for the given texel includes use of the first distance field characterizing a third distance between the given texel and an edge of the vector shape; and
the one or more physical processors are further configured by machine-readable instructions to:
determine the use of the one-distance field rendering based on the flag field for the individual ones of the texels; and
responsive to the determination of the use of the one-distance field rendering for the given texel, render the vector shape corresponding to the given texel based the first distance field.

3. The system of claim 1, wherein the intersection feature includes a corner, a bisector of the corner, or an iso-distance line.

4. The system of claim 1, wherein the use of the two-distance field rendering is limited to the texels on or around the intersection feature.

5. The system of claim 4, wherein the texels on or around the intersection feature include one or more two-by-two texel blocks.

6. The system of claim 5, wherein the texels on or around the intersection feature include margin texels around the one or more two-by-two texel blocks.

7. The system of claim 1, wherein the vector shape is rendered based the first distance field and the second distance field using bilinear interpolation.

8. The system of claim 1, wherein the intersection feature is curved.

9. The system of claim 1, wherein the one or more physical processors are further configured by machine-readable instructions to generate the distance map.

10. The system of claim 1, wherein the vector shape includes a text.

11. A method for rendering vector shapes, the method comprising:
rendering a vector shape using a distance map divided into texels, the distance map defining parameters on a per texel basis, the parameters including a flag value, a first distance value, and a second distance value such that the flag values of the texels form a flag field, the first distance values of the texels form a first distance field, and the second distance values of the texels form a second distance field, wherein the distance map characterizes the vector shape with the flag field, the first distance field, and the second distance field, the flag field indicating use of a one-distance field rendering or a two-distance field rendering for a given texel, the vector shape having a first edge and a second edge that defines an intersection feature, wherein the use of the two-distance field rendering for the given texel includes use of the first distance field characterizing a first distance between the given texel and the first edge and the second distance field characterizing a second distance between the given texel and the second edge, wherein rendering the vector shape using the distance map includes:
determining the use of the two-distance field rendering based on the flag field for individual ones of the texels; and
responsive to the determination of the use of the two-distance field rendering for the given texel, rendering the vector shape corresponding to the given texel based on the first distance field and the second distance field.

12. The method of claim 11, wherein:
the use of the one-distance field rendering for the given texel includes use of the first distance field characterizing a third distance between the given texel and an edge of the vector shape; and
further comprising:
determining the use of the one-distance field rendering based on the flag field for the individual ones of the texels; and
responsive to the determination of the use of the one-distance field rendering for the given texel, rendering the vector shape corresponding to the given texel based the first distance field.

13. The method of claim 11, wherein the intersection feature includes a corner, a bisector of the corner, or an iso-distance line.

14. The method of claim 11, wherein the use of the two-distance field rendering is limited to the texels on or around the intersection feature.

15. The method of claim 14, wherein the texels on or around the intersection feature include one or more two-by-two texel blocks.

16. The method of claim 15, wherein the texels on or around the intersection feature include margin texels around the one or more two-by-two texel blocks.

17. The method of claim 11, wherein the vector shape is rendered based the first distance field and the second distance field using bilinear interpolation.

18. The method of claim 11, wherein the intersection feature is curved.

19. The method of claim 11, furthering comprising generating the distance map.

20. The method of claim 11, wherein the vector shape includes a text.

* * * * *